(12) United States Patent
Umemoto et al.

(10) Patent No.: US 6,893,581 B2
(45) Date of Patent: May 17, 2005

(54) COMPOSITE MAGNETIC MATERIAL AND A METHOD FOR PRODUCING THE SAME

(75) Inventors: Takashi Umemoto, Hirakata (JP); Hideki Yoshikawa, Takarazuka (JP); Keiichi Kuramoto, Kadoma (JP); Hitoshi Hirano, Nishinomiya (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/353,299

(22) Filed: Jan. 28, 2003

(65) Prior Publication Data

US 2003/0148094 A1 Aug. 7, 2003

(30) Foreign Application Priority Data

Feb. 1, 2002 (JP) ........................................ 2002-025357

(51) Int. Cl.[7] ................................................. H01F 1/34
(52) U.S. Cl. ............................... 252/62.63; 252/62.56; 252/62.57; 252/62.58; 252/62.59; 252/62.6; 252/62.61; 252/62.62; 252/62.64
(58) Field of Search ............. 252/62.51 R, 62.56–62.64

(56) References Cited

U.S. PATENT DOCUMENTS

| | | | | | |
|---|---|---|---|---|---|
| 4,855,205 A | * | 8/1989 | Saha et al. | ............... | 430/111.33 |
| 5,494,749 A | * | 2/1996 | Kubo et al. | ................. | 428/402 |

FOREIGN PATENT DOCUMENTS

| | | | |
|---|---|---|---|
| EP | 1365423 | * | 11/2003 |
| JP | 60106114 | | 6/1985 |
| JP | 05-144615 | | 6/1993 |
| JP | 06333743 | | 12/1994 |
| JP | 07-254506 | | 10/1995 |
| JP | 09-115728 | | 5/1997 |
| JP | 11-224812 | * | 8/1999 |
| JP | 11-307336 | | 11/1999 |
| JP | 2003-048773 | | 2/2003 |
| JP | 2003-221232 | | 8/2003 |
| WO | WO 02/063640 | * | 8/2002 |

* cited by examiner

*Primary Examiner*—C. Melissa Koslow
(74) *Attorney, Agent, or Firm*—W. F. Fasse; W. G. Fasse

(57) ABSTRACT

A composite magnetic material contains first magnetic particles made of a first magnetic material and second magnetic particles made of a second magnetic material, the first and second magnetic particles being mixed with each other. A frequency characteristic of the first magnetic material is different from that of the second magnetic material. The first and second magnetic particles are mixed so that, at a frequency of an intersecting point between a first curve representing a frequency characteristic of a real part of a complex magnetic permeability of the first magnetic material and a second curve representing a frequency characteristic of a real part of a complex magnetic permeability of the second magnetic material, a value of a real part of a complex magnetic permeability of the composite magnetic material is larger than a value of the intersecting point.

22 Claims, 5 Drawing Sheets

COMPOSITE MAGNETIC MATERIAL AND A METHOD FOR PRODUCING THE SAME

BACKGROUND OF THE INVENTION

1. Field of the Invention

The present invention relates to a composite magnetic material capable of being used in a stacked composite device, an inductor or the like for constituting various types of electronic circuits provided in an electronics device such as a cellular phone, and to a method for producing the same.

2. Related Art

In recent years, a demand for downsizing has been increasingly built up in a small-sized electronic device such as a cellular phone. In such a situation, plural electronic circuits constituting an electronic device have been integrated into a stacked composite device on a single chip for mounting on a main substrate.

Figure 7:
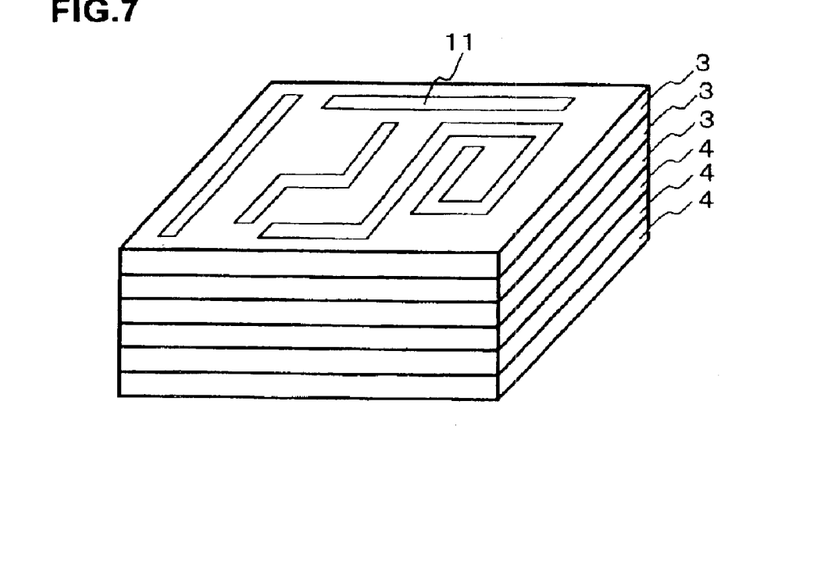
FIG. 7 is a perspective view showing one example of a stacked composite device.
Figure 8:
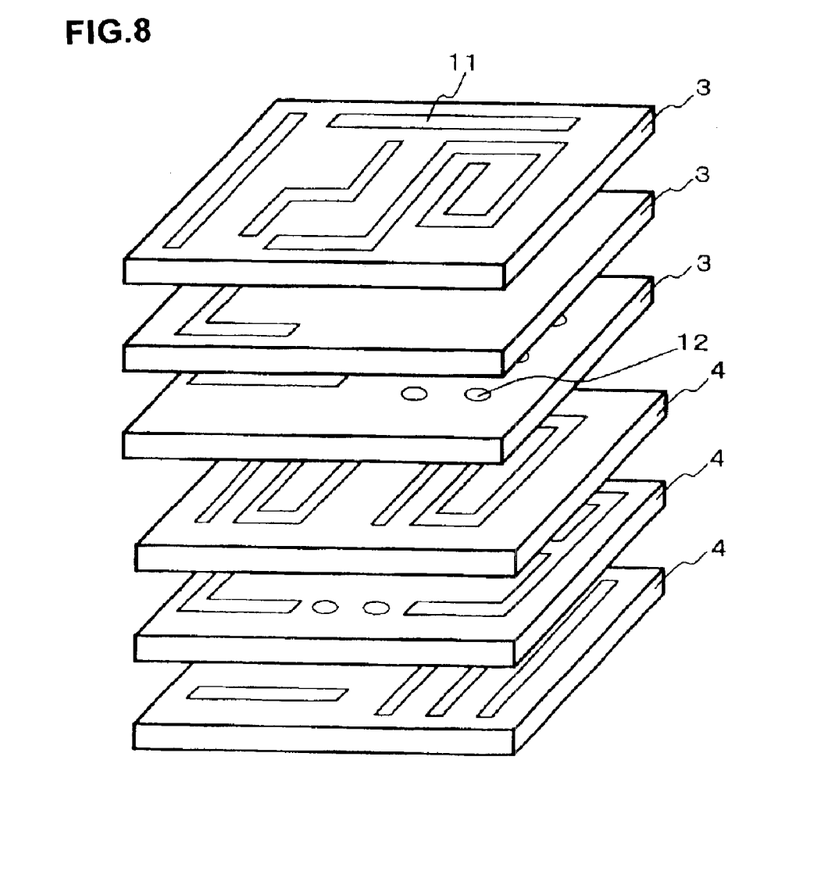
FIG. 8 is an exploded perspective view showing one example of a stacked composite device.

FIG. 7 is a perspective view showing an example of stacked composite device and FIG. 8 is an exploded perspective view thereof. A stacked composite device, as shown in FIGS. 7 and 8, is constructed by stacking plural ceramic layers 3 and 4. Plural circuit element patterns 11 each including an inductor or a capacitor are formed on surfaces of the ceramic layers 3 and 4. The circuit element patterns 11 are connected to each other by via holes 12 passing through the ceramic layers 3 and 4 or by conductor patterns formed on the ceramic layers 3 and 4, thereby to construct an electronic circuit such as a filter.

It is proposed that in a case where the ceramic layers 3 are magnetic ceramic layers and the ceramic layers 4 are dielectric ceramic layers, a pattern (L pattern) constituting an inductor is formed on each of the magnetic ceramic layers 3 and a pattern (C pattern) constituting a capacitor is formed on each of the dielectric ceramic layers 4 (Japanese Patent Laid Open No. S60-106114, Japanese Patent Laid Open No. H6-333743 and others).

Figure 9:
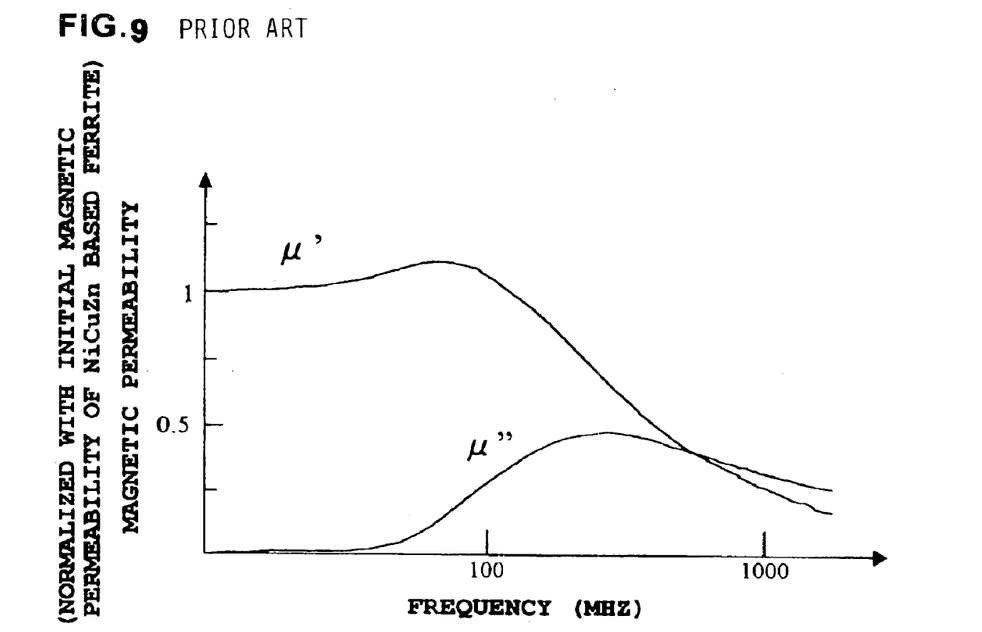
FIG. 9 is a view showing a frequency characteristic of magnetic permeability of NiCuZn-based ferrite.

As magnetic materials used in such a stacked composite device and an inductor, there has been generally heretofore used: a NiCuZn-based spinel type ferrite. FIG. 9 is a graph showing frequency characteristics of magnetic permeability of a NiCuZn-based spinel type ferrite. In FIG. 9, there are shown normalized values of a real part $\mu'$ and an imaginary part $\mu''$ of a complex magnetic permeability with the $\mu'$ at 10 MHz as 1. As shown in FIG. 9, the real part $\mu'$ of a complex magnetic permeability takes a comparatively high value in a region up to as high as a value in the vicinity of 100 MHz.

As magnetic materials capable of adapting to higher frequencies, there can be named a hexagonal ferrite. The hexagonal ferrite includes crystal structures of phases which are analogous to each other, such as a Z type, a Y type, a W type and an M type. The phase of the Z type, among them, shows a comparatively high magnetic permeability and reduction in magnetic permeability is minimized in a region up to as high as the GHz band.

Figure 10:
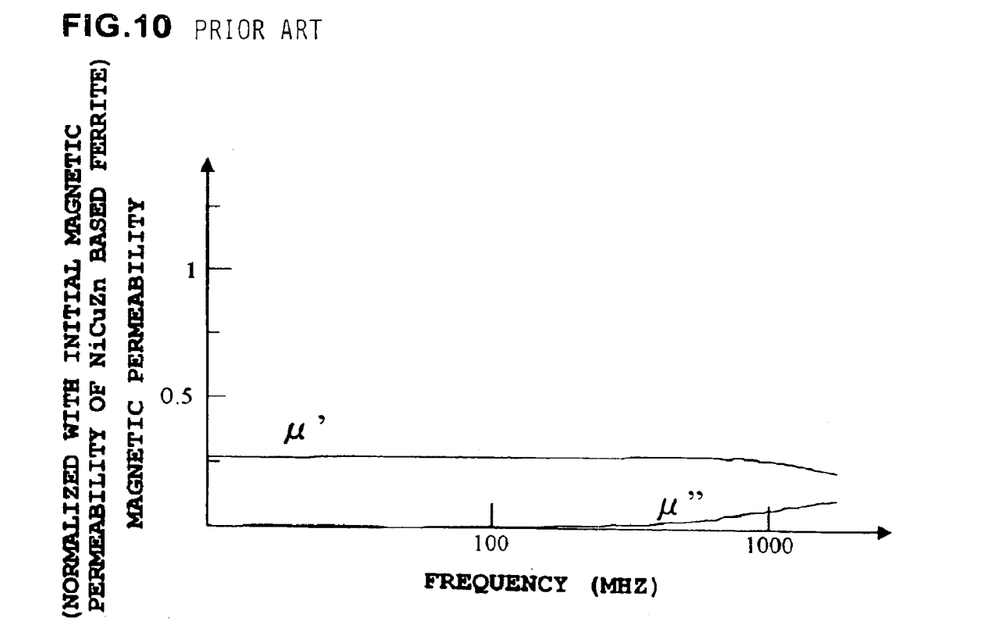
FIG. 10 is a view showing a frequency characteristic of magnetic permeability of Z type hexagonal ferrite.

FIG. 10 is a view showing a frequency characteristic of magnetic permeability of Z type hexagonal ferrite. In FIG. 10, the real part $\mu'$ and the imaginary part $\mu''$ of complex magnetic permeability are represented by normalized values regarding initial magnetic permeability of NiCuZn-based ferrite (real part $\mu'$ of complex magnetic permeability at 10 MHz) as 1. Also the same applies to the drawings showing frequency characteristics of magnetic permeability explained later.

As shown in FIG. 10, the Z type hexagonal ferrite is superior at high frequency characteristic since the decrease in magnetic permeability is relatively small up to the GHz band. However, the magnetic permeability is lower than that of NiCuZn-based ferrite.

A conventional spinel ferrite such as that of NiCuZn base, as shown in FIG. 9, can be used in a region up to as high as 100 MHz, whereas a natural resonance occurs in a region of higher frequencies to decrease a real part $\mu'$ of magnetic permeability but to contrary to this, increase an imaginary part $\mu''$ thereof (which is a Snoek limit). In addition, in the Z type hexagonal ferrite, there is a problem that the value of magnetic permeability is lower than that of the NiCuZn-based ferrite, while decrease in magnetic permeability is small up to the GHz band and hence it is superior at high frequency characteristic as described above.

Accordingly, in the conventional magnetic materials, it was difficult to achieve both of high magnetic permeability and excellent high frequency characteristic. Also, it was difficult to design the value and the frequency characteristic of magnetic permeability of the magnetic material at will.

SUMMARY OF THE INVENTION

It is an object of the present invention to provide a composite magnetic material capable of exhibiting high magnetic permeability even at a high frequency band and to provide a method for producing the same.

A composite magnetic material of the present invention comprises first magnetic particles made of a first magnetic material and second magnetic particles made of a second magnetic material, the first magnetic particles and the second magnetic particles being mixed with each other, and a frequency characteristic of the first magnetic material being different from that of the second magnetic material, wherein the first magnetic particles and the second magnetic particles are mixed so that at a frequency of an intersecting point between a first curve representing a frequency characteristic of a real part of a complex magnetic permeability of the first magnetic material and a second curve representing a frequency characteristic of a real part of a complex magnetic permeability of the second magnetic material, a value of a real part of a complex magnetic permeability of the composite magnetic material is larger than a value of the intersecting point. Also, at least one of the first magnetic material and the second magnetic material is a ferrite, and especially a Y type or Z type hexagonal ferrite.

In the present invention, at the frequency where the above intersecting point lies, the first magnetic particles and the second magnetic particles are mixed so that the value of the real part of complex magnetic permeability of the composite magnetic material is larger than the value of the above intersecting point. In other words, at the frequency where the intersecting point lies, the value of the real part of complex magnetic permeability of the composite magnetic material is larger than the real parts of complex magnetic permeability of the first magnetic material and the second magnetic material. Such a mixed state can be achieved by bringing the first magnetic particles and the second magnetic particles closer with each other in forms of fine particles to cause the magnetic exchange interaction between the first magnetic particles and the second magnetic particles.

Therefore, the composite magnetic material according to another aspect of the present invention comprises first magnetic particles made of a first magnetic material and second magnetic particles made of a second magnetic material, the first magnetic particles and the second magnetic particles being mixed with each other, and a frequency characteristic of the first magnetic material being different from that of the second magnetic material, wherein the first magnetic particles and the second magnetic particles are mixed so that a magnetic exchange interaction is generated between the first magnetic particles and the second magnetic particles. Also, at least one of the first magnetic material and the second magnetic material is a ferrite, and especially a Y type or Z type hexagonal ferrite.

According to the present invention, since the magnetic exchange interaction is generated between the first magnetic particles and the second magnetic particles, it is possible to obtain a magnetic material exhibiting higher magnetic permeability at a high frequency band than those of the first magnetic material and the second magnetic material.

In the present invention, as described above, the first magnetic particles and the second magnetic particles are uniformly mixed in forms of fine particles. Therefore, it is preferred that the particle sizes of the first magnetic particles and the second magnetic particles are as small as possible, and specifically the respective average particle sizes are preferably not more than 1 μm. Although the lower limit of the particle size is not particularly limited, the average particle size is generally not less than 1 nm since it is difficult to produce particles having particle sizes of less than 1 nm. The average particle size is more preferably in the range of 10 nm to 200 nm, and still more preferably 20 to 100 nm. The average particle size of the magnetic particles can be determined by measuring particle sizes of a suitable number of particles by an electron microscope.

Figure 2:
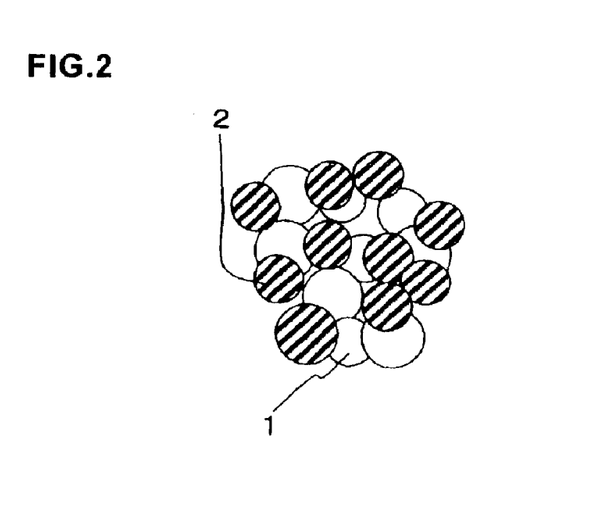
FIG. 2 is a view schematically showing a mixed state of first magnetic particles and second magnetic particles in a complex magnetic material of the present invention.

FIG. 2 is a view schematically showing the mixed state of the first magnetic particles and the second magnetic particles in the composite magnetic material of the present invention. As shown in FIG. 2, the first magnetic particles 1 and the second magnetic particles 2 are uniformly mixed wherein the second magnetic particles 2 exist around the first magnetic particles 1 and the first magnetic particles 1 exist around the second magnetic particles 2. Since the first magnetic particles 1 and the second magnetic particles 2 are mixed so as to be closed with each other, magnetic exchange interaction is generated between the first magnetic particles 1 and the second magnetic particles 2, so that high magnetic permeability can be obtained at a high frequency band.

It is preferred to use ferrite as the first magnetic material and the second magnetic material. For example, spinel-type ferrite may be used for one of the first magnetic material and the second magnetic material, and hexagonal ferrite may be used for the other of the first magnetic material and the second magnetic material. Also as the magnetic material, magnetic materials including at least one of the elements of Ni, Cu and Zn, and magnetic materials including at least one of the elements of Ba, Sr and Ca may be used.

In the present invention, the explanation is made reciting the first magnetic material and the second magnetic material, however the magnetic materials to be mixed are not limited to two kinds of magnetic materials, but three or more kinds of magnetic materials may be mixed. In such a case, it can be considered that either one or both of the first magnetic material and the second magnetic material is/are composed of a plurality of magnetic materials. For example, when a magnetic material obtained by mixing a magnetic material B and a magnetic material C is used as the second magnetic material, the magnetic material B and the magnetic material C are mixed in such a degree that magnetic exchange interaction is not generated therebetween, and a frequency characteristic of real part of complex magnetic permeability is determined for this mixed magnetic material, which can be considered as a curve representing a frequency characteristic of real part of complex magnetic permeability of the second magnetic material. Such mixing procedure not causing a magnetic exchange interaction is exemplified by a method of mixing the powders obtained by preliminarily sintering the raw material powders of the magnetic material B and the magnetic material C in a mortar.

Magnetic particles of the magnetic material A, the magnetic material B and the magnetic material C are mixed so as to satisfy the mixed state defined in the present invention, using the frequency characteristic curve of magnetic permeability of the second magnetic material composed of the magnetic material B and the magnetic material C, determined as described above, and the frequency characteristic curve of magnetic permeability of the first magnetic material composed of the magnetic material A.

In the case of using three or more kinds of magnetic materials, a combination of magnetic materials for the first magnetic material or the second magnetic material can be determined in accordance with the manner as described below. That is, magnetic materials are sorted in order of descending initial magnetic permeability (real part $\mu'$ of complex magnetic permeability at 10 MHz), and magnetic materials are combined in a descending order of initial magnetic permeability until the total of the mixing ratios of the respective magnetic materials becomes 40% by weight or more to be regarded as the first magnetic material, while the remaining magnetic materials are combined to be regarded as the second magnetic material. For example, consideration is made for the case where three kinds of magnetic materials A, B and C having the relationship of initial magnetic permeability of A>B>C are used. In the case where 40% by weight of the magnetic material A, 30% by weight of the magnetic material B and 30% by weight of magnetic material C are to be mixed, the magnetic material A is regarded as the first magnetic material due to its mixing ratio attaining to 40% by weight or more, and the combination of the remaining magnetic materials B and C (mixing ratio by weight 30:30, that is 1:1) is regarded as the second magnetic material. In the case where 30% by weight of the magnetic material A, 30% by weight of the magnetic material B and 40% by weight of magnetic material C are to be mixed, since the mixing ratio of the magnetic material A is 30% by weight, the magnetic material B is combined with the magnetic material A to render the total of the mixing ratios 60% by weight. That is, the combination of the magnetic materials A and B (mixing ratio by weight 1:1) is regarded as the first magnetic material, and the magnetic material C alone is regarded as the second magnetic material.

Next consideration is made for the case where four kinds of magnetic materials A, B, C and D that satisfy the relationship of initial magnetic permeability of A>B>C>D are used. For example, when the mixing ratio of each of the magnetic materials A, B, C and D is 25% by weight, the combination of the magnetic materials A and B (mixing ratio by weight 1:1) is regarded as the first magnetic material, and the combination of the magnetic materials C and D (mixing ratio by weight 1:1) is regarded as the second magnetic material. In the case where the magnetic materials A, B, C and D are mixed in the mixing ratios of 50% by weight, 30% by weight, 10% by weight and 10% by weight, respectively, the magnetic material A alone is regarded as the first magnetic material, while the combination of the magnetic materials B, C and D (mixing ratio by weight 3:1:1) is regarded as the second magnetic material.

The producing method of the present invention is a method for producing the above-described composite magnetic material of the present invention, which comprises the steps of: preliminarily sintering raw material powder including elements constituting the first magnetic material, to prepare first preliminarily-sintered powder; preliminarily sintering raw material powder including elements constituting the second magnetic material, to prepare second preliminarily-sintered powder; and mixing the first preliminarily-sintered powder and the second preliminarily-sintered powder under milling, to produce the composite magnetic material.

According to the present production method, the composite magnetic material is produced by mixing different kinds of preliminarily-sintered powder that are separately prepared under milling. Therefore, when using three or more kinds of magnetic materials, the preliminarily-sintered powder may be individually prepared for each magnetic material, and finally they may be mixed under milling.

A production method according to another aspect of the present invention comprises the steps of: preliminarily sintering a mixture of raw material powder including elements constituting the first magnetic material and raw material powder including elements constituting the second magnetic material, to prepare a mixture of first preliminarily-sintered powder and second preliminarily-sintered powder; and mixing the mixture of first preliminarily-sintered powder and second preliminarily-sintered powder under milling, to produce the composite magnetic material.

In the present production method, raw material powder of the respective magnetic materials are mixed in advance, and the mixed powder is preliminarily sintered, thereby preparing a mixture of the respective preliminarily-sintered powder, and the mixture or preliminarily-sintered powder is mixed under milling. Therefore, when three or more kinds of magnetic materials are used, raw material powder of each magnetic material is mixed in advance, and the resultant powder mixture is preliminarily sintered to prepare a mixture of preliminarily-sintered powder, and the mixtures of preliminarily-sintered powder can be mixed under milling.

The formed body of the present invention is characterized as obtained by sintering the above-described composite magnetic material of the present invention or the composite magnetic material produced by the production method of the present invention.

The formed body of the present invention may be produced by adding a binder to the composite magnetic material of the present invention and forming into a predetermined shape, followed by sintering. Alternatively, a green sheet may be formed using the composite magnetic material of the present invention, and after forming a predetermined circuit on the surface of the green sheet, the green sheets are stacked and sintered to render the formed body of the present invention.

DESCRIPTION OF THE PREFERRED EMBODIMENTS

Hereinafter, the present invention is described in more detail by reference to the Examples, which are not intended to limit the scope of the present invention.

EXAMPLE 1

NiO, CuO, ZnO and $Fe_2O_3$ of high purity were weighed so that they occupy 30 mol %, 20 mol %, 15 mol % and 35 mol %, respectively in terms of NiO, CuO, ZnO and $Fe_2O_3$. The weighed raw materials were mixed for 24 hours under milling in a ball mill using a pot and balls made of zirconia. Then the resultant mixture was preliminarily sintered for 2 hours at 900° C. to obtain preliminarily-sintered powder of NiCuZn-based ferrite (average particle size: 3 μm).

BaO, CoO and $Fe_2O_3$ of high purity were weighed so that they occupy 18 mol %, 12 mol % and 70 mol %, respectively in terms of BaO, CoO and $Fe_2O_3$. The weighed raw materials were mixed for 24 hours under milling in a ball mill using a pot and balls made of zirconia. Then the resultant mixture was preliminarily sintered for 2 hours at 1300° C. to obtain preliminarily-sintered powder of Z type hexagonal ferrite represented by $Ba_3Co_2Fe_{24}O_{41}$ (average particle size: 10 μm)

The above two kinds of preliminarily-sintered powder thus obtained were put into a ball mill using a pot and balls made of zirconia in a blending ratio of 50 wt. %:50 wt. % and mixed for 24 hours under milling to yield a composite magnetic material. The average particle size of this composite magnetic material was 30 nm.

A half of the composite magnetic material powder thus obtained was put into a ball mill together with PVA (polyvinyl alcohol)-based binder and an organic solvent, and mixed for 24 hours in wet condition. The blending amounts of the PVA-based binder and the organic solvent were 4 parts by weight and 50 parts by weight respectively, with respect to 100 parts by weight of the powder. Thereafter, the mixture was dried and screened, and the obtained powder was formed into a ring shape of 8 mm in outside diameter, 4 mm in inside diameter and 2 mm in height. This formed body was sintered by retention at 900° C. for 2 hours. The obtained ring-shaped sample was measured for its magnetic permeability by using an impedance analyzer.

Figure 3:
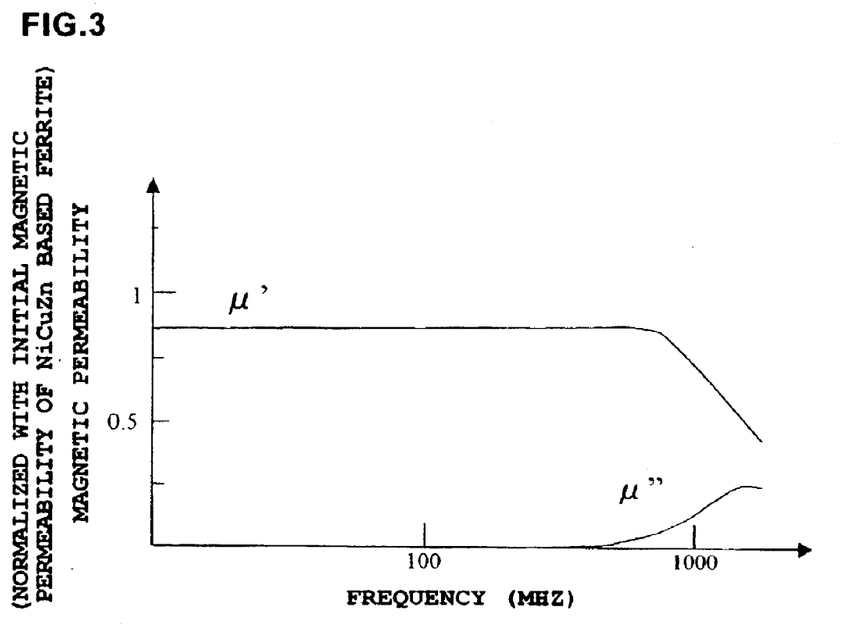
FIG. 3 is a view showing a frequency characteristic of magnetic permeability of a composite magnetic material of Example 1.

FIG. 3 is a view showing the result of measurement of magnetic permeability. As shown in FIG. 3, in the composite magnetic material obtained in accordance with the present invention, the real part $\mu'$ of magnetic permeability exhibits high values up to 1 GHz (1000 MHz). Also it can be seen that the imaginary part $\mu''$ of magnetic permeability which is a loss component does not substantially increase up to the vicinity of 1 GHz (1000 MHz). This revealed that the oxide magnetic material of Example 1 can be used with less loss in the GHz band.

Figure 1:
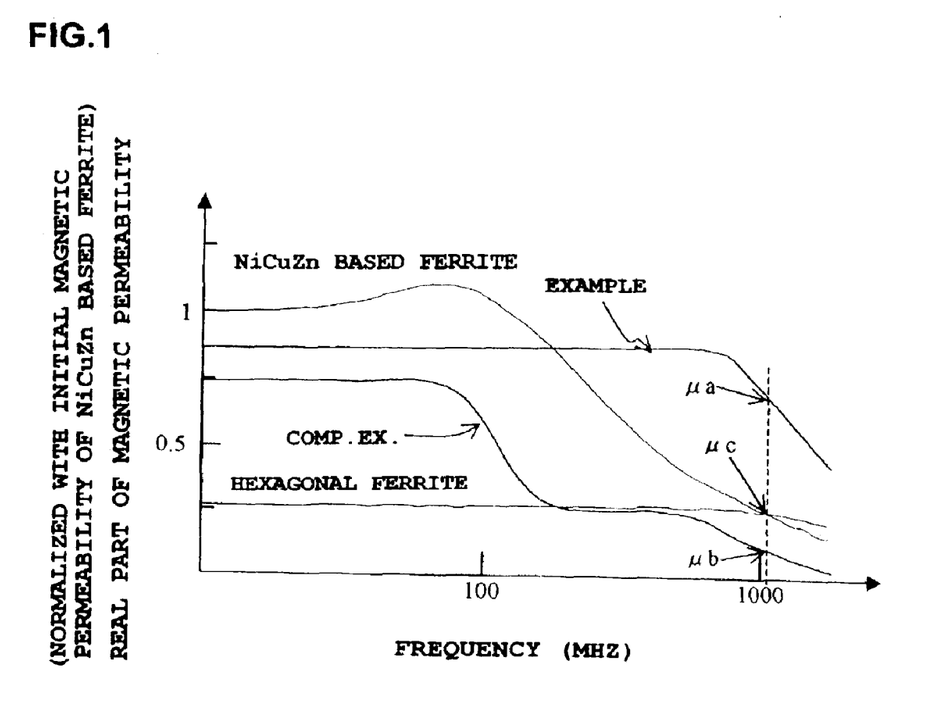
FIG. 1 is a view showing frequency characteristics of magnetic permeability of composite magnetic materials according to examples of the present invention.

FIG. 1 is a view showing the frequency characteristic of magnetic permeability of the composite magnetic material of Example 1 shown in FIG. 3, the frequency characteristic of magnetic permeability of NiCuZn-based ferrite which is the first magnetic material shown in FIG. 9, and the frequency characteristic of magnetic permeability of Z type hexagonal ferrite which is the second magnetic material shown in FIG. 10. The curve representing the frequency characteristic of the real part of complex magnetic permeability of NiCuZn-based ferrite and the curve representing the frequency characteristic of the real part of complex magnetic permeability of hexagonal ferrite cross each other at an intersecting point "$\mu c$". The intersecting point "$\mu c$" lies at a frequency which is slightly higher than 1000 MHz. At this frequency, the value of the real part of complex magnetic permeability of the composite magnetic material of Example 1 is "$\mu a$", which is higher than the value at the intersecting point "$\mu c$". Such a high value can be obtained owing to the magnetic exchange interaction between particles of NiCuZn-based ferrite and particles of hexagonal ferrite.

As for the remaining half of the oxide magnetic material powder obtained above, 5% by weight of a PVB (polyvinyl butyral)-based binder was added into the powder together with an organic solvent, and mixed in a ball mill to prepare a slurry. Using this slurry, a green sheet of a desired thickness was prepared by a doctor blade method. On the green sheet, an Ag paste was patterned by a printing method, to form a desired passive circuit. These green sheets were stacked in plural and pressed by a hydraulic press, followed by substantial sintering at 900° C., to produce a stacked inductor. The stacked inductor thus obtained was confirmed to have an excellent high frequency characteristic.

COMPARATIVE EXAMPLE

Each 50% by weight of the preliminarily-sintered powder of NiCuZn-based ferrite and the preliminarily-sintered powder of hexagonal ferrite obtained in the same manner as Example 1 were weighed, and after adding a binder as is in Example 1, they were mixed in a mortar without using a ball mill. The mixture thus obtained was formed into a ring shape and sintered at 900° C. in the same manner as Example 1.

Figure 4:
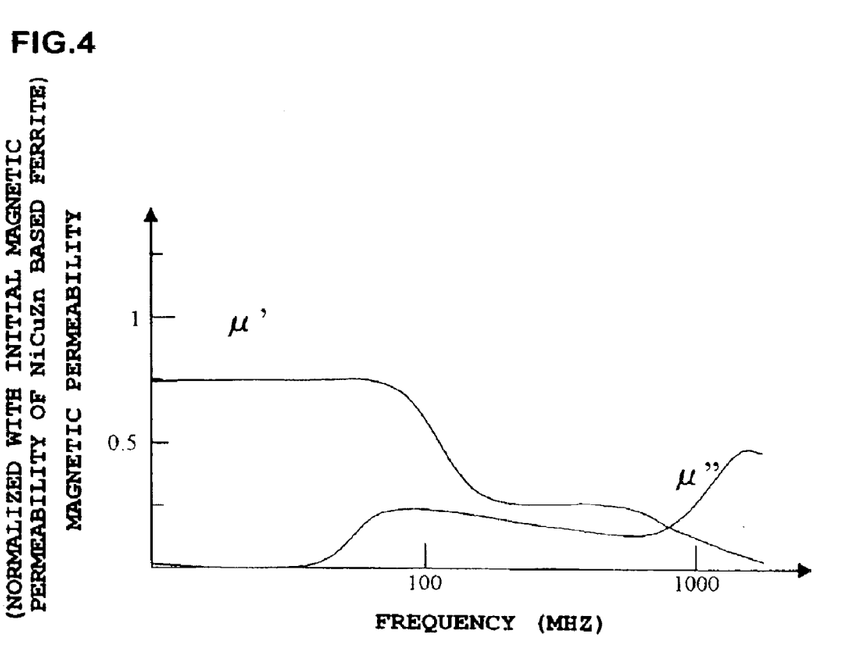
FIG. 4 is a view showing a frequency characteristic of magnetic permeability of a composite magnetic material of Comparative example.

The ring-shaped sample thus obtained was measured for frequency characteristic of magnetic permeability in the same manner as Example 1. FIG. 4 is a view showing a frequency characteristic of magnetic permeability of the magnetic material of Comparative Example. The real part $\mu'$ of complex magnetic permeability decreases in the vicinity of 100 MHz, while the imaginary part $\mu''$ increases in the vicinity of 100 MHz. Accordingly, the frequency characteristic is apparently different from that of Example 1.

In FIG. 1, the real part of complex magnetic permeability of the magnetic material of Comparative Example is shown together. As shown in FIG. 1, the real part of complex magnetic permeability of the magnetic material of Comparative Example takes a value of "$\mu b$" at the frequency of the intersecting point "$\mu c$", which is smaller than the value of "$\mu c$".

EXAMPLE 2

In Example 2, a mixture of the raw materials of the first magnetic material and the second magnetic material was preliminarily sintered, to prepare a mixture of the first preliminarily-sintered powder and the second preliminarily-sintered powder. This mixture of preliminarily-sintered powders was mixed under milling, thereby producing a composite magnetic material.

To be more specific, NiO, CuO, ZnO and $Fe_2O_3$ of high purity were weighed and mixed so that they occupy 30 mol %, 20 mol %, 15 mol % and 35 mol %, respectively in terms of NiO, CuO, ZnO and $Fe_2O_3$, and the resultant mixture is defined as raw material powder A. Likewise, BaO, CoO and $Fe_2O_3$ of high purity were weighed and mixed so that they occupy 20 mol %, 20 mol % and 60 mol %, respectively in terms of BaO, CoO and $Fe_2O_3$, and the resultant mixture is defined as raw material powder B.

The raw material powder A and the raw material powder B were mixed in ratio of 50% by weight to 50% by weight, under milling by ball milling using a pot and balls made of zirconia for 24 hours. Then the resultant mixture was sintered for 2 hours at 900° C. to obtain preliminarily-sintered powders. This preliminary sintering provided preliminarily-sintered powders having different compositions respectively corresponding to the raw material powders A and B. This mixture of preliminarily-sintered powders was then mixed under milling by ball milling using a pot and balls made of zirconia for 24 hours. As a result of this, a composite magnetic material including powder of NiCuZn-based ferrite and powder of Y type hexagonal ferrite represented by $Ba_2Co_2Fe_{12}O_{22}$ was obtained. The average particle size of the NiCuZn-based ferrite was 20 nm, and the average particle size of the Y type hexagonal ferrite was 30 nm.

Using the powder of the composite material obtained in the manner as described above, a ring-shaped sample was produced in the same manner as Example 1, and magnetic permeability thereof was measured.

Figure 5:
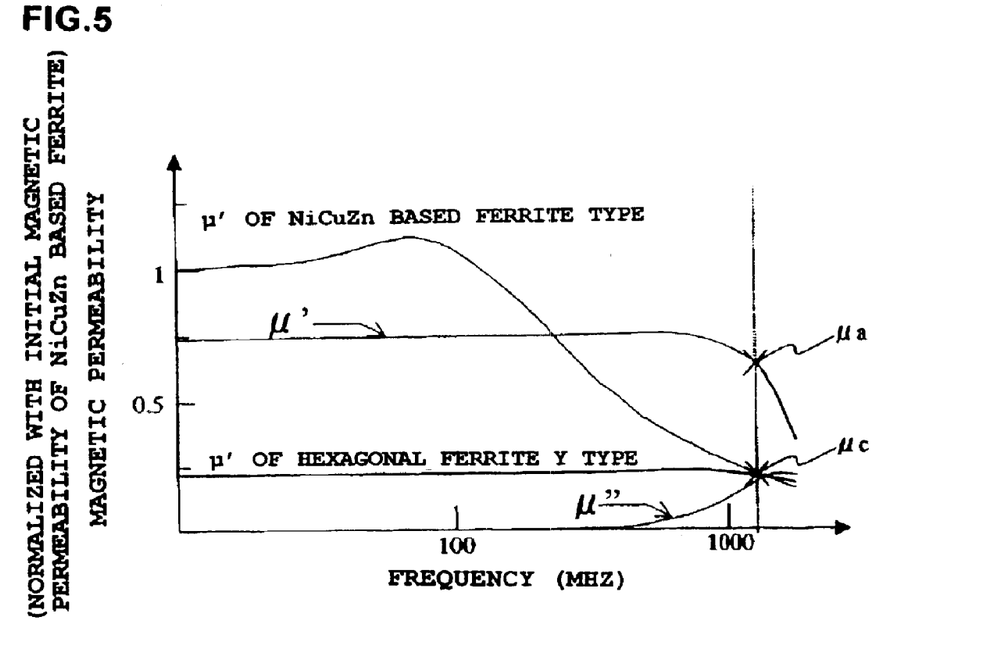
FIG. 5 is a view showing a frequency characteristic of magnetic permeability of a composite magnetic material of Example 2.

FIG. 5 is a view showing a frequency characteristic of magnetic permeability. As shown in FIG. 5, the real part $\mu'$ of complex magnetic permeability of the composite magnetic material of Example 2 exhibits high values up to 100 MHz. Furthermore, in FIG. 5, an intersecting point "$\mu c$" of the curve of the real part of complex magnetic permeability of NiCuZn-based ferrite and the curve of the real part of complex magnetic permeability of Y type hexagonal ferrite powder is shown. At the frequency where the intersecting point "$\mu c$" lies, the composite magnetic material of Example 2 exhibits a high value.

EXAMPLE 3

In Example 3, the composite magnetic material of the present invention was prepared using three kinds of magnetic materials.

In the same manner as Example 1, preliminarily-sintered powder of NiCuZn-based ferrite and preliminarily-sintered powder of Z type hexagonal ferrite were obtained.

Furthermore, BaO, CoO and $Fe_2O_3$ of high purity were weighed so that they occupy 20 mol %, 20 mol % and 60 mol %, respectively in terms of BaO, CoO and $Fe_2O_3$ and mixed to thereby prepare raw material powder. This raw material powder was mixed for 24 hours under milling by ball milling using a pot and balls made of zirconia. Then preliminary sintering was conducted at 1100° C. for 2 hours to obtain preliminarily-sintered powder of Y type hexagonal ferrite represented by $Ba_2Co_2Fe_{12}O_{22}$ (average particle size: 7 $\mu$m).

The above three kinds of preliminarily-sintered powder were put into a ball mill using a pot and balls made of zirconia in the blending ratio of 50 wt. % NiCuZn-based ferrite, 30 wt. % Z type hexagonal ferrite and 20 wt. % Y type hexagonal ferrite, and mixed for 24 hours in this ball mill under milling. Then, a PVA-based binder and an organic solvent were added and mixed for 24 hours by the ball mill in wet condition. Thereafter, a ring-shaped sample was produced in the same manner as Example 1. As the result of determination of quantity of the ring-shaped sample thus obtained based on the peak intensity of X-ray diffraction, existence of 29% by weight of Z type and 19% by weight of Y type was revealed. Then magnetic permeability of this ring-shaped sample was determined.

Figure 6:
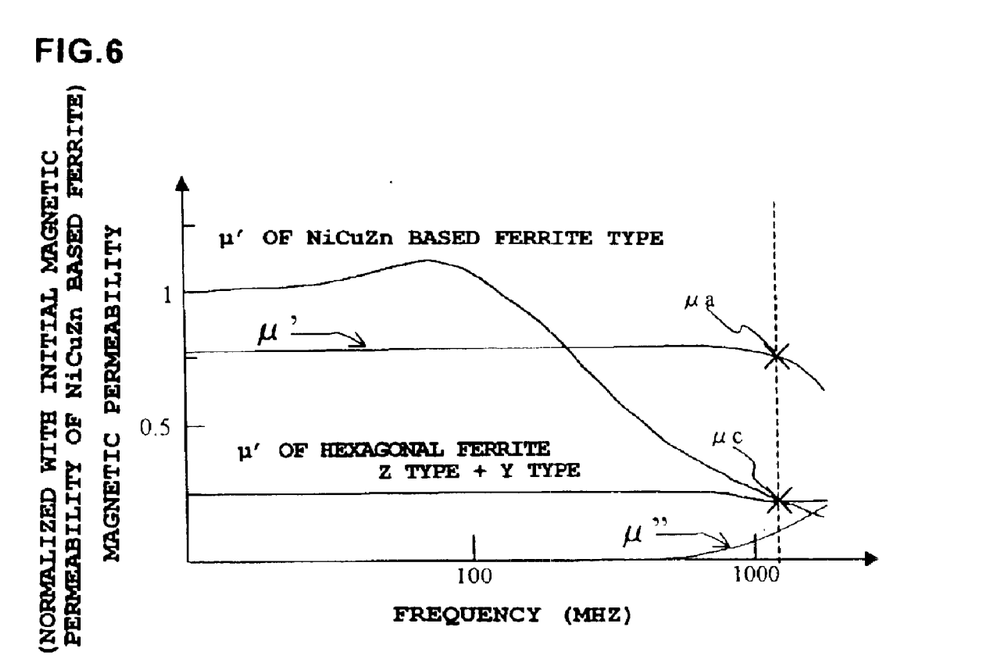
FIG. 6 is a view showing a frequency characteristic of magnetic permeability of a composite magnetic material of Example 3.

FIG. 6 is a view showing a frequency characteristic of magnetic permeability. As shown in FIG. 6, the real part $\square'$ of complex magnetic permeability in this Example also exhibits large values up to 1000 MHz. In addition, an intersecting point "$\mu c$" is shown in FIG. 6. This intersecting point "$\mu c$" is a intersecting point of the curve representing the frequency characteristic of the real part of complex magnetic permeability of NiCuZn-based ferrite and the curve representing the frequency characteristic of the real part of complex magnetic permeability of the mixture of the above two kinds of hexagonal ferrite powder sintered preliminarily (weight ratio Z type:Y type=30:20). The two kinds of hexagonal ferrite powder sintered preliminarily were mixed in a mortar, and a frequency characteristic of the real part of complex magnetic permeability of this mixture is shown in FIG. 6.

As shown in FIG. 6, at the frequency where the intersecting point "$\mu c$" lies, the composite magnetic material of Example 3 exhibits a higher value than the intersecting point "$\mu c$".

According to the present invention, it is possible to provide a composite magnetic material which can exhibit high magnetic permeability at a high frequency band. Also according to the present invention, since combination of different magnetic materials, as well as blending ratio thereof can be changed at will, it is possible to design the value and the frequency characteristic of magnetic permeability at will. Therefore, the composite magnetic material of the present invention is useful as a magnetic material used for a stacked inductor, LC filter, RF module and the like, and can also be used as an electromagnetic wave absorber.

In the above examples, frequency characteristics of magnetic permeability are shown up to the vicinity of 2 GHz are shown, however, the composite magnetic material of the present invention can be used at higher frequency bands (for example 5 GHz to 10 GHz).

What is claimed is:

1. A composite magnetic material comprising first magnetic particles made of a first magnetic material and second magnetic particles made of a second magnetic material, the first magnetic particles and the second magnetic particles being mixed with each other, and a frequency characteristic of the first magnetic material being different from that of the second magnetic material,
   wherein the first magnetic particles and the second magnetic particles are mixed so that at a frequency of an intersecting point between a first curve representing a frequency characteristic of a real part of a complex magnetic permeability of the first magnetic material and a second curve representing a frequency characteristic of a real part of a complex magnetic permeability of the second magnetic material, a value of a real part of a complex magnetic permeability of the composite magnetic material is larger than a value of the intersecting point, and
   wherein at least one of the first magnetic material and the second magnetic material is a Y type or Z type hexagonal ferrite.

2. A composite magnetic material comprising first magnetic particles made of a first magnetic material and second magnetic particles made of a second magnetic material, the first magnetic particles and the second magnetic particles being mixed with each other, and a frequency characteristic of the first magnetic material being different from that of the second magnetic material,
   wherein the first magnetic particles and the second magnetic particles are mixed so that a magnetic exchange interaction is generated between the first magnetic particles and the second magnetic particles, and
   wherein at least one of the first magnetic material and the second magnetic material is a Y type or Z type hexagonal ferrite.

3. The composite magnetic material according to claim 1, wherein the first magnetic material is a spinel-type ferrite, and the second magnetic material is the Y type or Z type hexagonal ferrite.

4. The composite magnetic material according to claim 1, wherein the first magnetic particles and the second magnetic particles each have an average particle size of not more than 1 $\mu$m.

5. The composite magnetic material according to claim 1, wherein the mixing is performed while milling the first magnetic particles and the second magnetic particles.

6. A method for producing the composite magnetic material according to claim 1, comprising the steps of:
   preliminarily sintering raw material powder including elements constituting the first magnetic material, to prepare first preliminarily-sintered powder;
   preliminarily sintering raw material powder including elements constituting the second magnetic material, to prepare second preliminarily-sintered powder; and
   mixing the first preliminarily-sintered powder and the second preliminarily-sintered powder under milling, to produce the composite magnetic material.

7. A method for producing the composite magnetic material according to claim 1, comprising the steps of:
   preliminarily sintering a mixture of raw material powder including elements constituting the first magnetic material and raw material powder including elements constituting the second magnetic material, to prepare a mixture of first preliminarily-sintered powder and second preliminarily-sintered powder; and
   mixing the mixture of first preliminarily-sintered powder and second preliminarily-sintered powder under milling, to produce the composite magnetic material.

8. A formed body obtainable by sintering the composite magnetic material according to claim 1.

9. A formed body obtainable by sintering a composite magnetic material produced by the method according to claim 6.

10. A formed body obtainable by sintering a composite magnetic material produced by the method according to claim 7.

11. The composite magnetic material according to claim 2, wherein the first magnetic material is a spinel-type ferrite, and the second magnetic material is the Y type or Z type hexagonal ferrite.

12. The composite magnetic material according to claim 2, wherein the first magnetic particles and the second magnetic particles each have an average particle size of not more than 1 $\mu$m.

13. The composite magnetic material according to claim 2, wherein the mixing is performed while milling the first magnetic particles and the second magnetic particles.

14. A method for producing the composite magnetic material according to claim 2, comprising the steps of:
   preliminarily sintering raw material powder including elements constituting the first magnetic material, to prepare first preliminarily-sintered powder;
   preliminarily sintering raw material powder including elements constituting the second magnetic material, to prepare second preliminarily-sintered powder; and
   mixing the first preliminarily-sintered powder and the second preliminarily-sintered powder under milling, to produce the composite magnetic material.

15. A method for producing the composite magnetic material according to claim 2, comprising the steps of:
   preliminarily sintering a mixture of raw material powder including elements constituting the first magnetic material and raw material powder including elements constituting the second magnetic material, to prepare a mixture of first preliminarily-sintered powder and second preliminarily-sintered powder; and
   mixing the mixture of first preliminarily-sintered powder and second preliminarily-sintered powder under milling, to produce the composite magnetic material.

16. A formed body obtainable by sintering the composite magnetic material according to claim 2.

17. A formed body obtainable by sintering a composite magnetic material produced by the method according to claim 14.

18. A formed body obtainable by sintering a composite magnetic material produced by the method according to claim 15.

19. The composite magnetic material according to claim 1, wherein said hexagonal ferrite comprises said Y type hexagonal ferrite.

20. The composite magnetic material according to claim 1, wherein said hexagonal ferrite comprises said Z type hexagonal ferrite.

21. The composite magnetic material according to claim 2, wherein said hexagonal ferrite comprises said Y type hexagonal ferrite.

22. The composite magnetic material according to claim 2, wherein said hexagonal ferrite comprises said Z type hexagonal ferrite.

* * * * *